April 17, 1951    H. H. WOLFE    2,549,276
FLOW INDICATOR
Filed Feb. 14, 1948    2 Sheets-Sheet 1
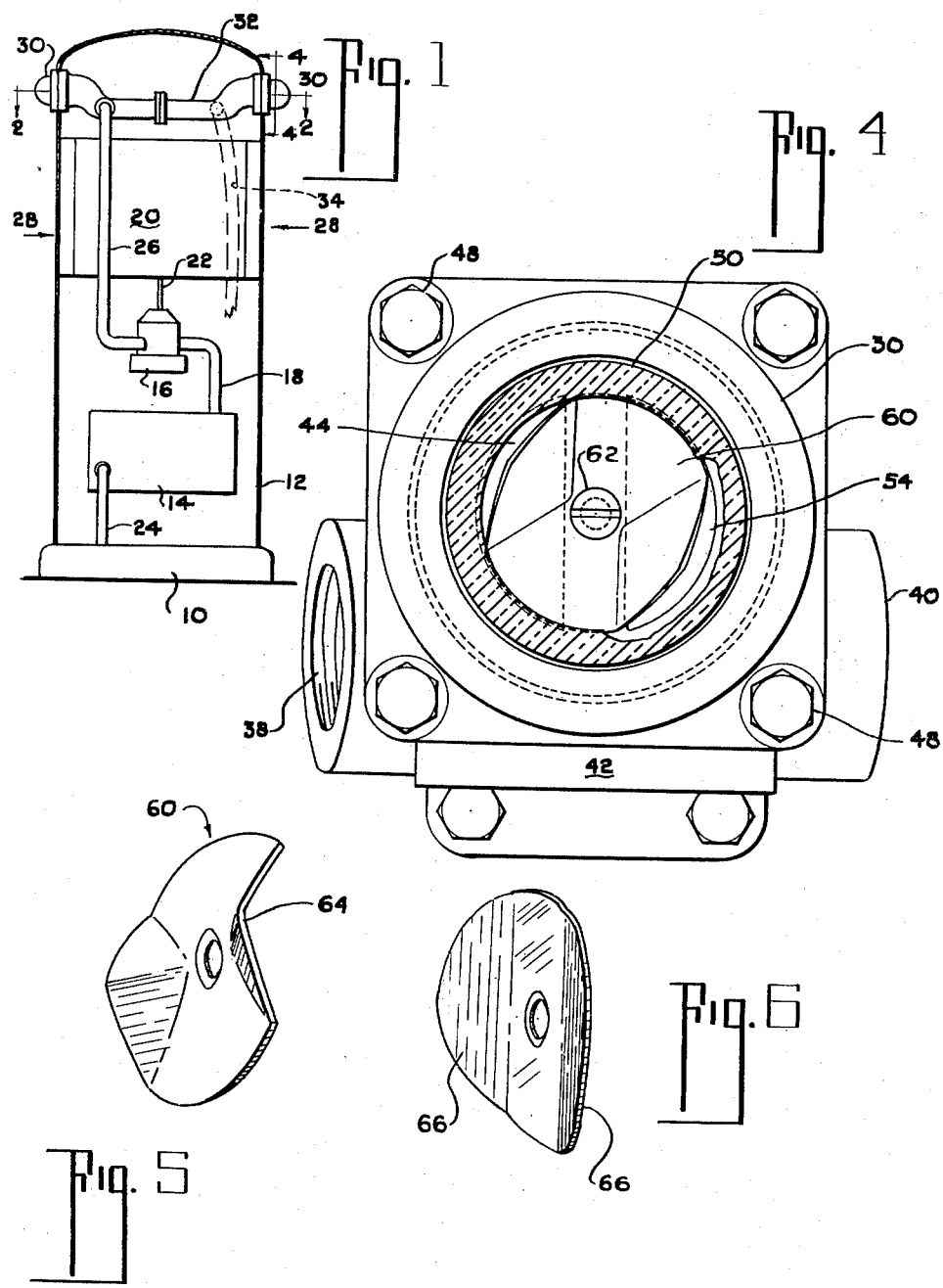
INVENTOR
H. HIX WOLFE
BY
ATTORNEYS

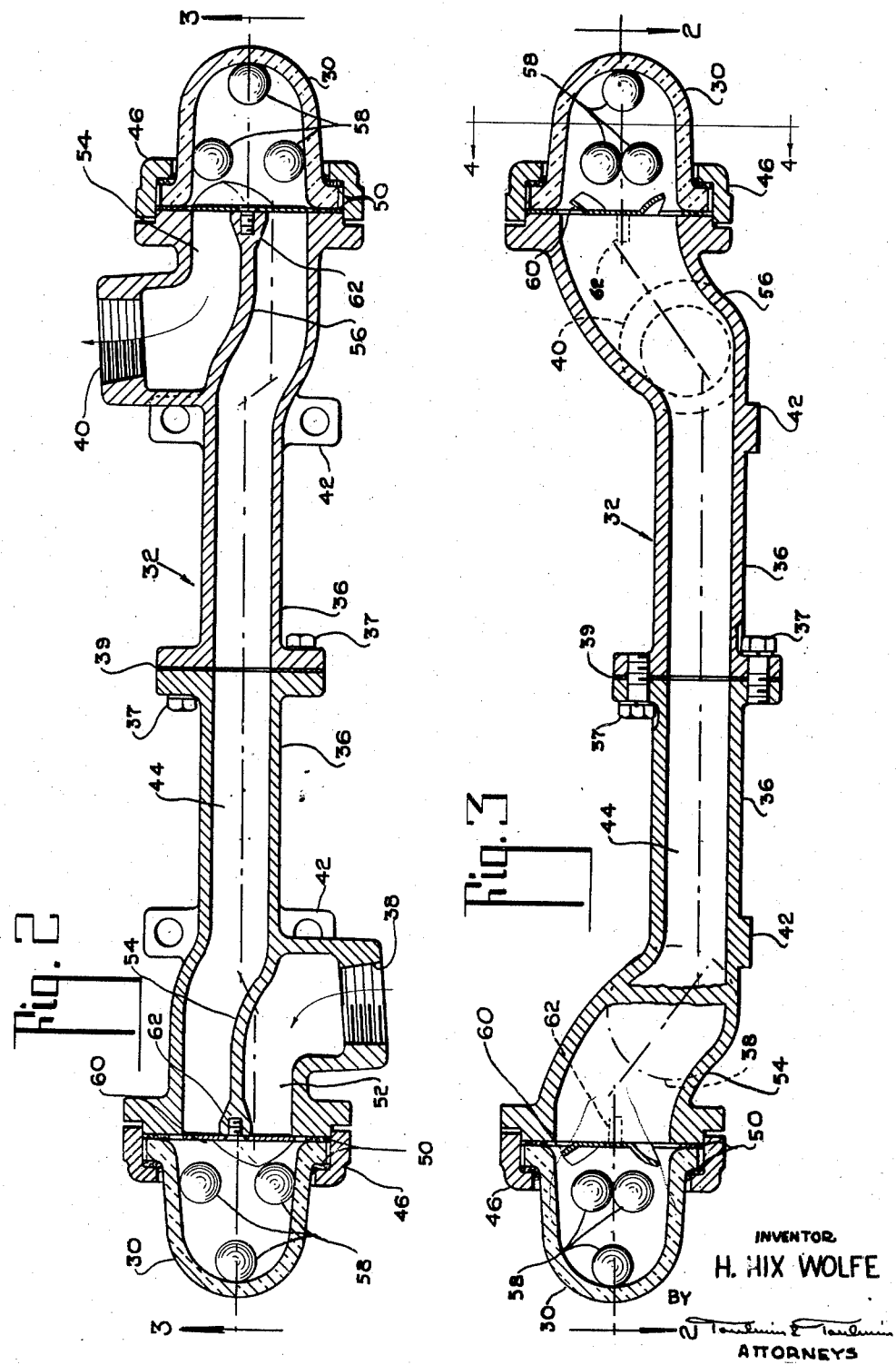

Patented Apr. 17, 1951

2,549,276

UNITED STATES PATENT OFFICE 2,549,276

FLOW INDICATOR

H. Hix Wolfe, Dayton, Ohio, assignor to The Dayton Pump and Manufacturing Company, Dayton, Ohio, a corporation of Ohio Application February 14, 1948, Serial No. 8,433

4 Claims. (Cl. 116—117)

This application relates to dispensing pumps for liquids, and particularly to pumps of this type which are used in filling stations.

In connection with dispensing pumps of the type referred to above there is generally a sight glass arrangement which has a movable element therein that indicates to the customer when fluid is being dispensed.

Ordinarily, these movable elements take the form of spinners or small propellers, and the like and are rotatably mounted beneath a glass cover means so as to be acted on by the fluid being puumped and rotate or otherwise move to give a clear visual indication of fluid flow.

One of the disadvantages encountered with spinner type flow indicators is that, being necessarily journaled, there is an inherent frictional drag which must be overcome before they commence to spin. Because of this, when the rate of fluid flow is very small there is a possibility that the spinners will not operate to indicate fluid flow.

Another disadvantage encountered in connection with spinner type flow indicators is that the cover glass therefor has a tendency to become cloudy and dirty due to precipitation thereon of tiny particles from the gasoline being pumped, such as coloring pigment and the like and thereby to obscure the sight of the moving member.

The primary object of the present invention is to provide an improved flow indicator for use with dispensing pumps and the like which will be exceedingly delicate in operation thereby giving a visual indication of the minutest fluid flows through the pump.

A still further object is the provision of a fluid flow indicator for dispensing pumps which eliminates the use of spinners and other movable elements journaled on or supported by parts of the flow indicating device.

It is also an object to provide a flow indicator for dispensing pumps and the like which at one time is very simple to construct but which gives a very striking indication of fluid flow therethrough.

A still further object is to provide a flow indicator having a cover glass thereon through which the movable part of the device can be observed and which is self cleaning in operation so that the said glass does not become obscured by particles which precipitate thereon from the fluid passing through the pump.

These and other objects and advantages will become more apparent upon reference to the following description taken in connection with the accompanying drawings in which:

Figure 1 is a diagrammatic sectional view taken through a dispensing pump and showing the location therein of the flow indicator of this invention;

Figure 2 is an enlarged transverse section taken through the flow indicator and is indicated by the line 2—2 on Figures 1 and 3;

Figure 3 is a vertical section taken through the flow indicator and is indicated by the line 3—3 on Figure 2;

Figure 4 is a transverse section taken through one of the sight glass members of the flow indicator and is indicated by the line 4—4 on Figures 1 and 3;

Figure 5 is a perspective view showing the preferred type of deflector for mounting at the point of entry of fluid into the sight glass element; and Figure 6 is a perspective view similar to Figure 5 and showing a somewhat modified form of deflector.

Referring to the drawings, the pump shown in Figure 1 comprises a base 10 having a housing 12 mounted thereon within which there is positioned a fluid pump 14, a fluid meter 16 connected with the pump by a conduit 18, and a computer and indicator 20 which is connected to be driven by the output shaft 22 of the meter 16.

The pump 14 draws the fluid to be pumped from any suitable reservoir arrangement by means of a conduit 24 while the fluid which passes through the meter 16 is discharged therefrom into a conduit 26.

As is customary with dispensing pumps of this type the computer and indicator 20 has a pair of visible faces thereon which are positioned one at the front and one at the back of the pump as indicated by the arrows 28 in Figure 1. The quantity of fluid dispensed and the price thereof is thus visible from each side of the pump.

Positioned adjacent each of the indicator faces 28, usually directly thereover, is a sight glass element 30. The sight glass elements 30 are mounted on the ends of an intermediate cast member 32 which receives adjacent one end the conduit 26 and which has connected adjacent its other end an outlet leading to the dispensing hose 34. All of the fluid pumped by the pump 12 is directed through the meter 16 and thence through the conduit 26 and member 32 to the dispensing hose 34.

The construction of the flow indicator of this invention will be better seen upon reference to Figures 2 through 4. In these figures it will be noted that the intermediate cast member 32 is composed of two substantially identical halves 36, the left hand one of which includes the tapped opening 38 for receiving the inlet conduit 26 and the right hand one of which has a similar tapped opening 40 to which is connected the outlet conduit leading to the dispensing hose 34. The parts 36 are interconnected by the bolts 37 to form the rigid member 32 and suitable gasket means as at 39 may be provided to prevent leakage between the parts.

Any suitable means for supporting the flow indicator device within the pump may be employed, but it is preferred to have mounting pads as at 42 thereon by means of which the indicator can be mounted on any suitable structural framework within the pump housing 12.

The member 32 has a flow passage 44 extending therealong and this passage opens at each end into one side of the dome like sight glasses 30 which are retained on the ends of the member 32 by means of the clamping rings 46.

It will be understood that the clamping rings 46 may be secured to the member 32 in any suitable manner either by screw threads or by means of the bolts 48 shown in Figure 4, and that suitable gasket means as indicated at 50 prevent any leakage of fluid from between the member 32 and the glasses 30.

Opening into the other side of the sight glass 30 at the left end of Figures 2 and 3 is a channel 52 leading into the inlet port 38. A partition or wall 54 is formed adjacent the port 38 which effectively divides the passages 44 and 52. The fluid which enters through the inlet port 38 must therefore flow along the passage 52 through the left hand sight glass 30 and then into the passage 44.

A similar arrangement obtains at the opposite end of the member 32 wherein the passage 44 enters one side of the sight glass 30 at that end, while the other side of the sight glass is connected by a passage 54 with the outlet port 40. As in the case of the inlet end of the member 32 a wall or partition 56 divides the passages 44 and 54.

Mounted within each of the sight glass members 30 is one or more ball like elements 58 which are movable by the fluid flowing through the sight glass and are preferably of different colors in order to give a sharp indication of fluid flow. These elements may be of any size to be freely movable within the sight glasses and may vary in number from one to as many as it is desired to place within the sight glasses. It has been found that three balls in each sight glass is sufficient to give a good indication of fluid flow, and these may have contrasting colors as, for example, red, green and yellow, or white, or whatever particular combination is most effective with the particular fluid being pumped.

In weight the balls or movable elements should approximate the specific gravity of the fluid being pumped in order to be very active within their sight glasses and may be slightly lighter or slightly heavier than the fluid, with the slightly heavier elements being preferred.

In order to provide for a swirling action of the fluid as it passes through the sight glasses there is preferably a deflector member 60 secured to the end of the member 32 at the base of each of the sight glasses. These deflector members may be secured to the partitions that divide the passages from the member 32 as by means of the screws 62.

The preferred type of deflector is shown in Figures 2, 3, 4 and 5 and comprises a thin, say, about one-thirty-second of an inch thick, disc having two diametrically opposite parts turned up as indicated at 64. These turned up parts provide openings through which the fluid enters and leaves the sight glass and directs the fluid with a sort of jet action along the side of the sight glass so that it takes a swirling path therethrough and agitates the balls or movable elements in the glass.

At the same time the deflector members may serve as cages to retain the balls or movable elements within the sight glasses so that they do not pass along the passages in the member 32. Preferably, the deflector members are positioned angularly relative to the horizontal as illustrated in Figure 4, since it has been found that this arrangement of the said deflector drives the movable elements within the sight glasses in the most striking path.

It is to be observed that the movable elements are entirely free within their enclosing sight glasses to move in any path in which they may be driven by the action of the fluid passing through the sight glasses. Due to this freedom of movement the movable elements continually strike and rub against the inside surface of the enclosing glasses. This provides for a scouring or cleaning action which prevents the accumulation of any clouding sediment on the inside surfaces of the sight glasses. To this end, the balls or movable elements are made of a substance at least slightly softer than the material in the sight glasses 30, whereby the said glasses are not scratched at any time by these elements. The glasses always retain a clean and clear appearance and the movable elements therein are always clearly visible.

It will also be noted that due to the fact that the movable elements are entirely unconstrained within their enclosing sight glasses due to the jet action of the fluid through the sight glasses, any fluid flow, however slight, will cause these elements to become active and move and give an indication of the said flow. This is a distinct advantage over former spinner type indicators which did not respond to very slight fluid flows.

A still further advantage which obtains from the fact that the balls within the sight glasses are free to move in any direction is that they are as easily visible from the side of the sight glasses as they are from the front or end thereof. Accordingly, substantially equal vision is obtainable from each sight glass throughout an entire half sphere.

Figure 6 shows a somewhat modified form of deflector member 65 which may be employed in place of the deflector member 60 shown in Figures 2 through 5, and is substantially the same as the said deflector member except that it has its two side parts turned up as at 66 into flat wing parts rather than the V-shaped turned up parts at 64 on the deflector 60. In either case the fluid flowing through the sight glass is given a swirling action which activates the elements 58 therein.

It will be understood that this invention is susceptible to modification in order to adapt it to different usages and conditions and, accordingly, it is desired to comprehend such modifications within this invention as may fall within the scope of the appended claims.

I claim:

1. In a flow indicator for dispensing pumps and the like: a dome-like transparent member having a base, a plurality of balls loosely disposed within said member and freely movable therein relative to each other, and means mounted at the base of said member for retaining said balls therein and for directing fluid flow therethrough from one side to the other of said dome-like member, said means comprising a disc-like element having parts at its opposite edges displaced from the plane of the element to define inlet and outlet openings for said member, a conduit member on which said dome-like member and disc-like element are mounted and having inlet and outlet passages therein communicating with said inlet and outlet openings, respectively, the said passages being angularly offset from said openings whereby the fluid flow through the openings is in a direction at an angle to the axis of said dome-like member, thereby causing the fluid flow through the transparent member to be of a swirling turbulent nature.

2. In a flow indicator for dispensing pumps and the like: a dome-like transparent member having a base, a plurality of ball-like elements loosely disposed and freely movable within said member, and means mounted at the base of said member for retaining said balls therein and for directing fluid flow therethrough from one side to the other of said dome-like member, said means comprising a generally flat disc-like element having parts at its opposite edges displaced from the plane of the element inwardly of said transparent member to form inlet and outlet openings for said member, said parts being V-shaped in cross section, a conduit member on which said dome-like member and disc-like element are mounted and having inlet and outlet passages therein communicating with said inlet and outlet openings, respectively, the said passages being effectively angularly offset from said openings whereby the fluid flow through the openings is in a direction at an angle to the axis of said dome-like member, thereby causing the fluid flow through the transparent member to be of a swirling turbulent nature.

3. In a flow indicator of the character described: a fluid conducting support means having a pair of adjacent substantially semicircular ports opening out the end thereof, a dome-like transparent closure member having an open face mounted on the end of said support means so said ports open into opposite sides of the open face thereof, a plurality of ball-like elements loosely disposed within said member, and a baffle plate mounted on the end of said support means and overlying said ports to prevent the said elements from passing therein, said baffle plate having parts over each port, each part being displaced in a single plane and of less circumferential extent than the said port, said parts being displaced out of the plane of the said plate to provide communication of the ports with the interior of the said closure member, and at least one of said parts being located to one side of the axis of symmetry of the associated port so as to cause the fluid flow pertaining to the said port to swirl about a line parallel to the axis of said transparent member, thereby to activate said ball-like elements therein, said elements having substantially the same specific gravity as the fluid which activates them, whereby they respond to small rates of fluid flow through said transparent member.

4. In a flow indicator for dispensing pumps and the like: a dome-like transparent member having a base, a plurality of balls loosely disposed within said member and freely movable therein relative to each other, and means mounted at the base of said member for retaining said balls therein and for directing fluid flow therethrough from one side to the other of said dome-like member, said means comprising a disc-like element having parts at its opposite edges displaced from the plane of the element to define inlet and outlet openings for said member, a conduit member on which said dome-like member and disc-like element are mounted and having inlet and outlet passages therein communicating with said inlet and outlet openings, respectively, the said passages being angularly offset from said openings whereby the fluid flow through the openings is in a direction at an angle to the axis of said dome-like member, thereby causing the fluid flow through the transparent member to be of a swirling turbulent nature, said balls having substantially the same specific gravity as the fluid which activates them and said balls being softer than said transparent member whereby they will tend to scour the inside of the transparent member but will not have an abrasive action thereon.

H. HIX WOLFE.

REFERENCES CITED

The following references are of record in the file of this patent:

UNITED STATES PATENTS

| Number | Name | Date |
|---|---|---|
| 1,227,842 | Sellin | May 29, 1917 |
| 1,730,118 | Cobb | Oct. 1, 1929 |
| 2,219,677 | Benzin | Oct. 29, 1940 |
| 2,259,593 | Turner | Oct. 21, 1941 |